United States Patent Office 3,097,229
Patented July 9, 1963

---

3,097,229
CYCLOALIPHATIC CHLOROCARBANILATES
David J. Beaver, Richmond Heights, and Paul J. Stoffel, St. Louis, Mo., assignors to Monsanto Chemical Company, St. Louis, Mo., a corporation of Delaware
No Drawing. Filed Mar. 4, 1960, Ser. No. 12,676
7 Claims. (Cl. 260—471)

This invention relates to a new class of organic chemical compounds. More particularly, this invention is concerned with novel and useful compounds generally designated as cycloaliphatic halogenated carbanilates and to antiseptic formulations incorporating such compounds.

It is an object of this invention to provide new halogenated carbanilates which possess antiseptic properties. It is also an object of this invention to provide a process for the preparation of such compounds.

A further object of this invention is to provide formulations incorporating said compounds. A more specific object of the invention is to incorporate said compounds in organic formulations which display a high degree of bacteriostatic activity.

Still further objects, advantages and features of the invention will become apparent upon consideration of the following detailed description and the examples attendant thereto.

The cycloaliphatic halogenated carbanilates of this invention may be represented by the structural formula

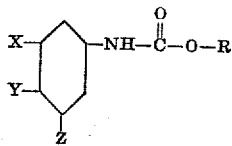

where R is a cycloalkyl or cycloalkenyl radical, and X, Y and Z are selected from chlorine, bromine and hydrogen, provided that at least two of X, Y and Z are chlorine or bromine. Illustrative of the halocarbanilates encompassed by this invention are those in which R is cyclopentyl, cyclohexyl, cycloheptyl, cyclooctyl, cyclononyl, 2-cyclopentenyl, 2-cyclohexenyl, 3-cyclohexenyl, 4-cycloheptenyl, 2-cyclooctenyl, 3-cyclononenyl and 5-cyclononenyl. The cycloaliphatic radicals represented by R also include those having alkyl substituents of from 1 to 4 carbon atoms such as 2-methyl-cyclopentyl 3-ethyl-cyclohexyl, 2-isopropyl-cycloheptyl, 3-isobutyl-cycloheptyl and the like.

In accordance with this invention the new carbanilates are prepared by reacting a halophenylisocyanate with an alcohol, ROH, where R is a cycloaliphatic radical as defined above. In general the reactants are simply stirred in a reactor. An exothermic reaction occurs, and the mixture is held at the elevated temperature for a short period of time thereafter. The desired product may be obtained as a solid or an oil. In the case of the former, the carbanilate is recrystallized in a suitable solvent such as heptane, xylene, benzene or the like. With an oil, recovery is achieved by distillation or by use of a separatory funnel.

The details of preparation will be more fully understood by reference to the examples which follow. These examples set forth representative starting materials, quantities of reactants and reaction conditions. It should be emphasized that such examples are not to be construed as limiting the scope of this invention but are solely for the purpose of illustration.

EXAMPLE I

Cyclohexyl 3,4-Dichlorocarbanilate

A suitable reactor was charged with 18.8 grams (0.1 mole) of 3,4-dichlorophenylisocyanate. There was added 10.0 grams (0.1 mole) of cyclohexanol with stirring. An exothermic reaction took place, and the temperature rose from 25° C. to about 85–90° C. The reaction mixture was then further heated to maintain the elevated temperature for about ½ hour. The mixture is poured hot into 150 ml. of heptane, and upon cooling, a product crystallized in the form of white granules. Upon filtration, a yield of 27.6 grams (98% of theory) of cyclohexyl 3,4-dichlorocarbanilate is obtained, M.P. 118.7–119° C. Analysis showed 24.77% of chlorine as compared with a calculated value of 24.60%.

EXAMPLE II

Cyclopentyl 3,4-Dichlorocarbanilate

A suitable reactor was charged with 18.8 grams (0.1 mole) of 3,4-dichlorophenylisocyanate. There was added 8.6 grams (0.1 mole) of cyclopentanol with stirring. An exothermic reaction took place, and the temperature rose from 25° C. to about 85–90° C. The reaction mixture was then further heated to maintain the elevated temperature for about ½ hour. The mixture is poured hot into 150 ml. of heptane, and upon cooling, a product crystallized in the form of colorless prisms. Upon filtration, a yield of 27.2 grams (99.2% of theory) of cyclopentyl 3,4-dichlorocarbanilate is obtained, M.P. 103.4–104.1° C. Analysis showed 20.03% of chlorine as compared with a calculated value of 25.83%.

EXAMPLE III

Cycloheptyl 3,4-Dichlorocarbanilate

A suitable reactor was charged with 18.8 grams (0.1 mole) of 3,4-dichlorophenylisocyanate. There was added 11.4 grams (0.1 mole) of cycloheptanol with stirring. An exothermic reaction took place, and the temperature rose from 25° C. to about 85–90° C. The reaction mixture was then further heated to maintain the elevated temperature for about ½ hour. The mixture is poured hot into 150 ml. of heptane, and upon cooling, a product crystallized in the form of colorless granules. Upon filtration, a yield of 29.6 grams (98.3% of theory) of cycloheptyl 3,4-dichlorocarbanilate is obtained, M.P. 105.5–106.2° C. Analysis showed 23.32% of chlorine as compared with a calculated value of 23.45%.

EXAMPLE IV

2-Cyclopentenyl 3,4-Dichlorocarbanilate

A suitable reactor was charged with 18.8 grams (0.1 mole) of 3,4-dichlorophenylisocyanate. There was added 8.4 grams (0.1 mole) of 2-cyclopentene-1-ol with stirring. An exothermic reaction took place, and the temperature rose from 25° C. to about 85–90° C. The reaction mixture was then further heated to maintain the elevated temperature for about ½ hour. The mixture is poured hot into 150 ml. of heptane, and upon cooling, a product crystallized in the form of colorless needles. Upon filtration, a yield of 24.8 grams (91.3% of theory) of 2-cyclopentenyl 3,4-dichlorocarbanilate is obtained, M.P. 89.9–90.8° C. Analysis showed 26.18% of chlorine as compared with a calculated value of 26.03%.

Other exemplary compounds which are prepared in accordance with the procedures outlined above include: cyclopentyl 3,4-dibromocarbanilate; cyclohexyl 3,5-dibromocarbanilate; cycloheptyl 3,4,5-trichlorocarbanilate; and 2-cyclohexenyl 4,5-dichlorocarbanilate.

The compounds of this invention having the general formula given above have been found to display bacteriostatic or antiseptic properties when incorporated in formulations including a cleansing agent. It should be pointed out that the most outstanding properties are exhibited where the phenyl radical contains chlorine substituents at the 3 and 4 positions and R is unsubstituted. By cleansing agents is meant soaps or other detergents, mixtures thereof and also certain crude oil derivatives such as white mineral oil and petrolatum. The term soap is employed in its popular meaning and refers to cleansing agents usually made by the action of an alkali on fat or fatty acids, e.g., the sodium or potassium salts of either saturated or unsaturated fatty acids. By way of example each of the compounds described in Examples I through IV above was separately incorporated in a neutral high grade white soap (a mixture of 80 percent sodium soap and 20 percent potassium soap produced from a 70 percent tallow and 30 percent oil glyceride blend in accordance with U.S. Patent 2,295,594), in a weight ratio of two parts to 100 parts by weight soap. Aliquots of each were added to a Saboraud's dextrose agar medium so as to give concentrations of the compounds in the agar as set forth in Table I below. The agar in each case was then poured into a petri dish, allowed to harden, and then innoculated with a standard culture of the bacterium *Micrococcus pyogenes* var. *aureus* of standard resistance. The incubation in each instance was made simultaneously at 37° C. for 48 hours. The extent of growth is noted below:

TABLE I

| Compound | Concentration (1 part per) | | | |
|---|---|---|---|---|
| | 1T | 10T | 100T | 1M |
| Cyclohexyl 3,4-dichlorocarbanilate | — | — | — | — |
| Cyclopentyl 3,4-dichlorocarbanilate | — | — | — | — |
| Cycloheptyl 3,4-dichlorocarbanilate | — | — | — | — |
| 2-Cyclopentenyl 3,4-dichlorocarbanilate | — | — | — | — |

NOTE: T=thousand; M=million; — =no growth.

It is to be understood that the use of the cycloaliphatic halocarbanilates with soap as set forth in the above table is merely illustrative. These compounds may also be used with other detergents including the so-called anionic and non-ionic detergents and have proven equally effective therein. Other alkali metal soaps of higher fatty acids of animal or vegetable origin may be used such as stearic, lauric, palmitic, oleic, linoleic, ricinoleic, and the like, including mixtures thereof obtained from tallow, lard, coconut oil, palm oil, castor oil, olive oil, hydrogenated fish and cottonseed oils and the like.

The detergents contemplated by this invention include the well known organic anionic type such as the surface active alkali metal sulfonates and sulfates. Representative of these are the long chain alkyl aryl sulfonates, i.e. those wherein the alkali radical is straight or branched in structure and contains from 8 to 22 carbon atoms, but preferably 10 to 16 carbon atoms, examples of such being octyl, decyl, dodecyl, keryl, pentadecyl, hexadecyl, octadecyl, mixed long chain alkyls derived from long chain fatty materials such as the lauryl radical, cracked paraffin wax olefins, polymers of lower mono-olefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

Other sulfonate surface-active agents are also contemplated, e.g. the long chain alkyl sulfonates such as sodium hexadecane sulfonate and sodium octadecane sulfonate.

The well known sulfate detergents having 12 to 26 carbon atoms and particularly those having an alkyl radical of about 8 to 22 carbon atoms may be employed as anionic detergent bases in accordance with this invention. Such detergents include the sulfuric acid esters of polyhydric alcohols incompletely esterified with fatty acids, e.g., sodium coconut oil monoglyceride mono-sulfate, sodium tallow diglyceride mono-sulfate, the pure and mixed higher alkyl sulfates such as sodium lauryl sulfate and sodium cetyl sulfate. Further descriptive information regarding these compounds may be found in U.S. Patent 2,264,737.

Additional anionic surface active sulfonates and sulfates contemplated by this invention are the sulfated and sulfonated alkyl acid amides such as Igepon T $C_{17}H_{33}CO$ $NHCH_2$ $CH_2SO_3Na$); the sulfated and sulfonated esters such as Igepon AP ($RCOOCH_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, sodium salt of sulfosuccinic acids such as $NaOOCCH_2CH(SO_3Na)CONHC_{18}H_{27}$ and the like.

In addition to the organic anionic detergents, the non-ionic surface-active agents containing the desired cycloaliphatic halocarbanilate derivatives provide effective bacteriostatic cleansing formulations. The non-ionic surface active agents contemplated are viscous liquid to wax-like water-soluble surface-active substances containing a polyglycol ether group of the structure

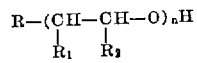

wherein $R_1$ and $R_2$ are hydrogen or short chain alkyl, where $n$ is an integer greater than 3, and where R is a residue of a compound of a monomeric organic compound having an active hydrogen, e.g. alcohols, phenols, amides, primary amines, secondary amines, carboxylic acids, etc. These non-ionic detergents are well known (note U.S. 1,970,588 and U.S. 2,213,477) and may be typified by the polyalkylene oxide derivatives (i.e. polyethylene oxide, polypropylene oxide, polybutylene oxide) of water-insoluble higher fatty acids, such as lauric, oleic, palmitic, and stearic acid and the like or mixtures thereof, such as the mixtures of fatty acids, obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), oil or phenols, particularly alkyl phenols containing at least six alkyl carbon atoms such as isooctyl-, di-tertiary butyl-, triisopropyl-, nonyl-, dodecyl-, octadecyl- phenols or naphthols, or higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful non-ionic detergent is that obtained by condensing one mol of tall oil with 5 to 15 mols of ethylene oxide (see U.S. 2,550,691.)

The cycloaliphatic halocarbanilates are also useful in preparing cleansing formulations with a combination of surface active detergents plus other ingredients as illustrated by the following:

| | Parts by weight |
|---|---|
| Triethanol amine lauryl sulfate | 60 |
| Methyl cellulose | 2 |
| Propylene glycol | 4 |
| Potassium stearate | 6 |
| Water | 130 |
| Cyclohexyl 3,4-dichlorocarbanilate | 1 |

Moreover, the compounds of this invention may be incorporated in a detergent or mixtures of detergents to form useful antiseptic formulations as illustrated by the following:

| | Parts by weight |
|---|---|
| Tall oil-ethylene oxide condensation product (1 mol tall oil-11 mols ethylene oxide) | 20 |
| Sodium dodecyl benzene sulfonate | 80 |
| Carboxy methyl cellulose, sodium | 4 |
| Sodium tripolyphosphate | 80 |
| Sodium sulfate | 200 |
| Cyclopentyl 3,4-dichlorocarbanilate | 1 |

The cycloaliphatic halocarbanilates of this invention may be employed in cosmetic formulations ordinarily used to beautify, cleanse or protect the skin in an amount sufficient to kill or to inhibit the growth of bacteria, specifically *Micrococcus pyogenes* var. *aureus*, normally present on the skin. Relatively small amounts of the cycloaliphatic halocarbanilates of this invention in cosmetics, particularly those having as a base an anionic or non-ionic organic detergent composition or a combination thereof, have been found to yield effective antiseptic formulations. With respect to cosmetics having an anionic or non-ionic detergent base amounts as low as 0.1% to 1% by weight based upon the total weight of the organic detergent may be employed. It is preferred in detergent cleansing formulations having an anionic detergent base or non-ionic detergent base to employ these cycloaliphatic halocarbanilates in amounts in the order of 1% to 3% by weight based on the total weight of detergent. While larger amounts with respect to the detergent base may be employed, the upper limit will be determined by practical considerations as well as by the particular cosmetic formulation involved, i.e. whether said formulation is to be used for cleansing purposes in the sense of a toilet soap or as a shaving cream or as a shampoo, etc. In cleansing formulations in the sense of a toilet soap containing an anionic organic detergent base (e.g. an alkali metal fatty acid detergent soap alone or in admixture with another anionic organic detergent such as the aforedescribed sodium alkyl aryl sulfonate detergents) or non-ionic detergent base, the amount of cycloaliphatic halocarbanilates of this invention ordinarily will not exceed 10% by weight of the detergent base. However, in shampoos, shaving creams and the like, employing an anionic detergent base or non-ionic detergent base the cycloaliphatic halocarbanilates of this invention may be present to the extent of 50% by weight based on the total detergent base content. Various colored pigments and dyes, antioxidants, perfumes, water-softeners, salts such as silicates, chlorides, carbonates, phosphates and sulfates of alkali metals and the like builders, sodium carboxy methyl cellulose, the low molecular weight alcohols such as methanol, ethanol, isopropanol, ethylene glycol, and the like, may be included where desirable.

The cycloaliphatic halocarbanilates of this invention may also be incorporated in antiseptic creams and ointments. Such formulations generally employ a crude oil derivative as the cream or ointment base, more specifically, white mineral oil or petrolatum. The carbanilates are incorporated into such bases by gentle warming and subsequent stirring to insure homogeneity. These bases are semisolid in consistency and have a melting point high enough to prevent liquefaction below at least 100° C. A typical formulation with such a semisolid base is as follows:

| | Percent |
|---|---|
| U.S.P. petrolatum | 19 |
| White mineral oil (65–75 viscosity) | 63 |
| White beeswax | 6 |
| White paraffin | 11.5 |
| Cyclopentyl 3,4-dichlorocarbanilate | 0.5 |

The carbanilate is preferably used in amounts which will not exceed 10% by weight of the semisolid base.

While this invention has been described with respect to certain embodiments, it is not so limited and it is to be understood that variations and modifications thereof obvious to those skilled in the art may be made without departing from the spirit or scope of this invention.

The embodiments of the invention in which an exclusive property or privilege is claimed are defined as follows:

1. A compound of the formula

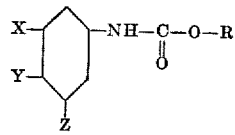

where R is selected from the group consisting of cycloalkyl and cycloalkenyl of from 5 to 9 carbon atoms and alkylated cycloalkyl and cycloalkenyl of from 5 to 9 carbon atoms in the alicyclic ring and having a single alkyl substituent of from 1 to 4 carbon atoms, and X, Y and Z are each selected from the group consisting of chlorine, bromine and hydrogen, at least two of X, Y and Z being other than hydrogen.

2. A compound of the formula,

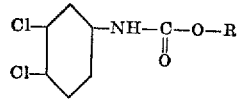

where R is cycloalkyl of from 5 to 9 carbon atoms.

3. A compound of the formula

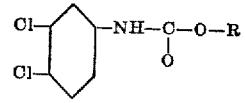

where R is cycloalkenyl of from 5 to 9 carbon atoms.
4. Cyclopentyl 3,4-dichlorocarbanilate.
5. Cyclohexyl 3,4-dichlorocarbanilate.
6. Cycloheptyl 3,4-dichlorocarbanilate.
7. 2-cyclopentyl 3,4-dichlorocarbanilate.

References Cited in the file of this patent
UNITED STATES PATENTS

| | | |
|---|---|---|
| 1,870,107 | Fuller | Aug. 2, 1932 |
| 2,647,916 | Kaiser | Aug. 4, 1953 |
| 2,742,434 | Kopp | Apr. 17, 1956 |
| 2,806,051 | Brockway | Sept. 10, 1957 |
| 2,843,522 | Mahon | July 15, 1958 |
| 2,858,328 | Beaver et al. | Oct. 28, 1958 |
| 2,931,777 | Shelanski | Apr. 5, 1960 |
| 2,945,877 | Zima et al. | July 19, 1960 |

OTHER REFERENCES

Beaver et al.: J. Am. Chem. Soc., 79, 1236–45 (1957).

UNITED STATES PATENT OFFICE
CERTIFICATE OF CORRECTION

Patent No. 3,097,229                  July 9, 1963

David J. Beaver et al.

It is hereby certified that error appears in the above numbered patent requiring correction and that the said Letters Patent should read as corrected below.

Column 2, line 27, for "20.03%" read -- 26.03% --; column 6, line 45, for "2-cyclopentenyl" read -- 2-cyclopentenyl --.

Signed and sealed this 10th day of November 1964.

(SEAL)
Attest:

ERNEST W. SWIDER
Attesting Officer

EDWARD J. BRENNER
Commissioner of Patents